(12) United States Patent
Ghielmetti et al.

(10) Patent No.: US 7,716,196 B2
(45) Date of Patent: May 11, 2010

(54) METHOD FOR CULLING A LITIGATION DISCOVERY FILE SET

(75) Inventors: Jeffrey Brian Ghielmetti, Scotts Valley, CA (US); Cynthia Lynn Ghielmetti, Scotts Valley, CA (US); Daniel M. Fischler, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 192 days.

(21) Appl. No.: 11/501,154

(22) Filed: Aug. 7, 2006

(65) Prior Publication Data

US 2008/0033904 A1 Feb. 7, 2008

(51) Int. Cl.
G06F 17/30 (2006.01)

(52) U.S. Cl. .................. 707/705; 707/736; 707/741; 707/747

(58) Field of Classification Search .................. 707/1, 707/687, 692, 694, 696, 698, 705, 736, 747, 707/741, 758
See application file for complete search history.

(56) References Cited

U.S. PATENT DOCUMENTS

| | | | | |
|---|---|---|---|---|
| 5,542,087 A * | 7/1996 | Neimat et al. | .................. | 707/10 |
| 6,286,032 B1 * | 9/2001 | Oberlander et al. | ......... | 709/203 |
| 6,820,081 B1 * | 11/2004 | Kawai et al. | .................... | 707/7 |
| 7,035,876 B2 * | 4/2006 | Kawai et al. | ............. | 707/104.1 |
| 7,130,858 B2 * | 10/2006 | Ciaramitaro et al. | ........ | 707/101 |
| 7,315,865 B1 * | 1/2008 | Jernigan, IV | ................ | 707/102 |
| 7,333,616 B1 * | 2/2008 | Brettle et al. | ............... | 380/277 |
| 7,444,492 B2 * | 10/2008 | Matsuzaki | ................... | 711/203 |
| 7,451,155 B2 * | 11/2008 | Slackman et al. | ........... | 707/100 |
| 7,475,107 B2 * | 1/2009 | Maconi et al. | .............. | 709/202 |
| 7,519,673 B2 * | 4/2009 | Zakarian et al. | ............. | 709/206 |
| 7,577,656 B2 * | 8/2009 | Kawai et al. | ................... | 707/7 |

OTHER PUBLICATIONS

Gary E. Fisher; "Computer Forensics Guidance"; ITL Bulletin Nov. 2001, National Institute of Standards and Technology Software Diagnostics and conformance Testing Division; update Oct. 12, 2001; 4 Pages.

* cited by examiner

*Primary Examiner*—Jean M Corrielus
(74) *Attorney, Agent, or Firm*—Stolowitz Ford Cowger LLP (57) ABSTRACT

Methods and systems for culling a litigation discovery file set are described. A directory of the litigation discovery file set is traversed. A hashcode corresponding to a file in the directory is computed. The hashcode is compared to a database and if the hashcode matches an entry in the database, then the file is removed.

16 Claims, 6 Drawing Sheets

METHOD FOR CULLING A LITIGATION DISCOVERY FILE SET

TECHNICAL FIELD

Embodiments pertain to an automated litigation discovery method. In particular, embodiments pertain to culling litigation discovery files.

BACKGROUND

In law, litigation discovery is the pre-trial phase in a lawsuit in which each party can request and/or compel the production of documents and other evidence from other parties. Often, litigation discovery is a process that includes manually gathering data from different sources. For large corporations, the litigation discovery process frequently involves gathering data from a multitude of sources such as databases, individual custodians, web sources, tape backups, hardcopy documents, document repositories, emails, and/or other relevant sources. In addition, not only does the litigation discovery process for large corporations involve accessing a large number of sources, each of the accessed sources often yield a high volume of possibly relevant data as well.

Moreover, the data gathered frequently contain standard software application files (e.g., standard readme files, standard text files, and/or standard log files), which are not needed for data analysis, but cause the individual file sizes to be larger than needed and add to the overall data size inflation. In some instances, these standard software application files can take up 70% of the file size of the data gathered.

Consequently, the litigation discovery process for large corporations is often exceedingly time-consuming because it involves processing of a daunting amount of data. As a result, litigation discovery processes can be highly costly.

DETAILED DESCRIPTION OF THE DRAWINGS

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which can be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention can be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

In general, data gathered during a litigation discovery process for an enterprise or organization tends to quite large. The large overall file size is, at least in part, caused by an abundance of irrelevant files (e.g., standard software application files, common system files, and/or catalogs) that do not yield useful information from a litigation perspective. The impact of irrelevant files can be irritatingly detrimental, taking up to 70% of the overall litigation discovery file size in certain situations. In one example, as resources are dedicated to processing of standard application files, the efficiency of a litigation discovery process is reduced.

To address these concerns, embodiments set forth methods and systems for culling a litigation file set. In one embodiment, a directory of the litigation discovery file set is traversed. A hashcode, such as a Message Digest 5 (MD5) hashcode, corresponding to a file (e.g., a standard application file) in the directory is computed. The hashcode is compared to a database (e.g., National Institute of Stanards database and/or an enterprise-specific database) and if the hashcode matches an entry in the database, then the file (e.g., a standard software application file) may be automatically removed. In one embodiment, metadata associated with the file is maintained such that the files in a directory can be restored to its original state.

Embodiments allow an automatic culling of litigation discovery files and thus, advantageously, embodiments can make the litigation discovery process more efficient and less costly by removing files, such as common system files, that are not relevant to the litigation discovery process.

Figure 1:
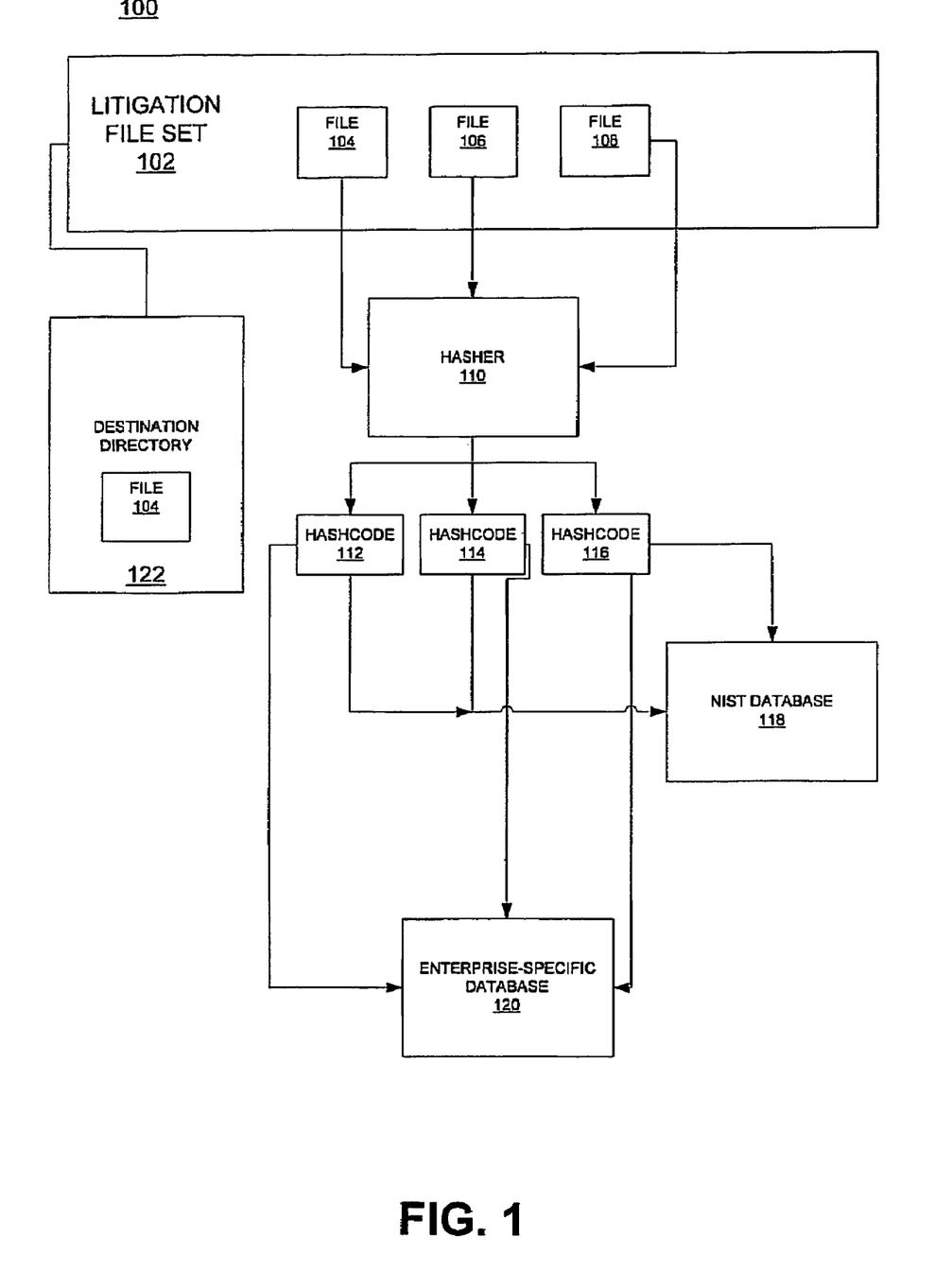
FIG. 1 illustrates block diagrams of a litigation discovery file set culling system, upon which embodiments can be implemented.

FIG. 1 illustrates block diagrams of a litigation discovery file set culling system 100, upon which embodiments can be implemented. Litigation discovery file set culling system 100 includes litigation file set 102, file 104, file 106, file 108, hasher 110, hashcode 112 associated with file 104, hashcode 114 associated with file 106, hashcode 116 associated with file 108, National Institute of Standards database 116, enterprise-specific database 120, and destination directory 122.

Although litigation discovery file set culling system 100 is shown and described as having certain numbers and types of elements, the embodiments are not necessarily limited to the exemplary implementation. That is, litigation discovery file set culling system 100 can include elements other than those shown, and can include more than one of the elements that are shown. For example, litigation discovery file set culling system 100 can include a greater or fewer number of files than the three files (file 104, file 106, and file 108) shown. Similarly, in another example, litigation discovery file set culling system 100 can include a greater or fewer number of databases than the two databases (NIST database 118 and enterprise-specific database 120) shown.

In one embodiment, the litigation file set 102 is traversed. In one embodiment, the traversal starts automatically if a user specified condition is met. In one example, the traversal encounters file 104, file 106, and file 108. In order to determine whether each of the file is a standard application file, hasher 110 is utilized to compute hashcodes associated with the three files (e.g., file 104, 106, and 108). A hashcode or hash value can be thought of as a digital "fingerprint" of a file. In general, a well designed hash function is a one-to-one function, and as such, a particular input yields a particular hashcode or hash value. Consequently, if two hash values match, it implies that the two files from which the hash values were generated have identical contents.

In one embodiment, Hasher 110 generates hashcode 112 corresponding to file 104, hashcode 114 corresponding to file 106, and hashcode 116 corresponding to file 108. In one embodiment, the hashcodes (e.g., hashcodes 112, 114, and 116) are compared to databases that contain hashcodes of standard application files, such as NIST database 118 and enterprise-specific database 120. Other types of databases, such as a user-defined database, may also be utilized.

In one embodiment, NIST database 118 includes a hashcode of a standard application file that matches hashcode 114. Further, enterprise-specific database 120 includes a hashcode of a standard enterprise application file that matches hashcode 116. By implication, a standard application file matches file 106 and a standard enterprise application file matches file 108.

In one example, files that do not match any existing standard application files and standard enterprise application files are stored in a destination directory (e.g., destination directory 122). In one embodiment, hashcode 112 corresponding to file 104 does not match the hashcode of any standard application files in NIST database 118. Also, hashcode 112 corresponding to file 104 does not match the hashcode of any standard enterprise application files in enterprise specific database 120. Consequently, file 104 is stored in destination directory 122.

Embodiments facilitate reduction of litigation discovery file set sizes by generating hash values of one or more litigation discovery files, comparing the hash values to one or more databases containing hash values of standard files, and, in one embodiment, automatically only places files that did not match the hash values of standards files into a destination directory. In another embodiment, files that did match the hash values of standard files may also be placed into a destination directory to comply with user specification. Further, in one embodiment, metadata associated with the file is maintained such that the files in a directory can be restored to its original state.

Figure 2:
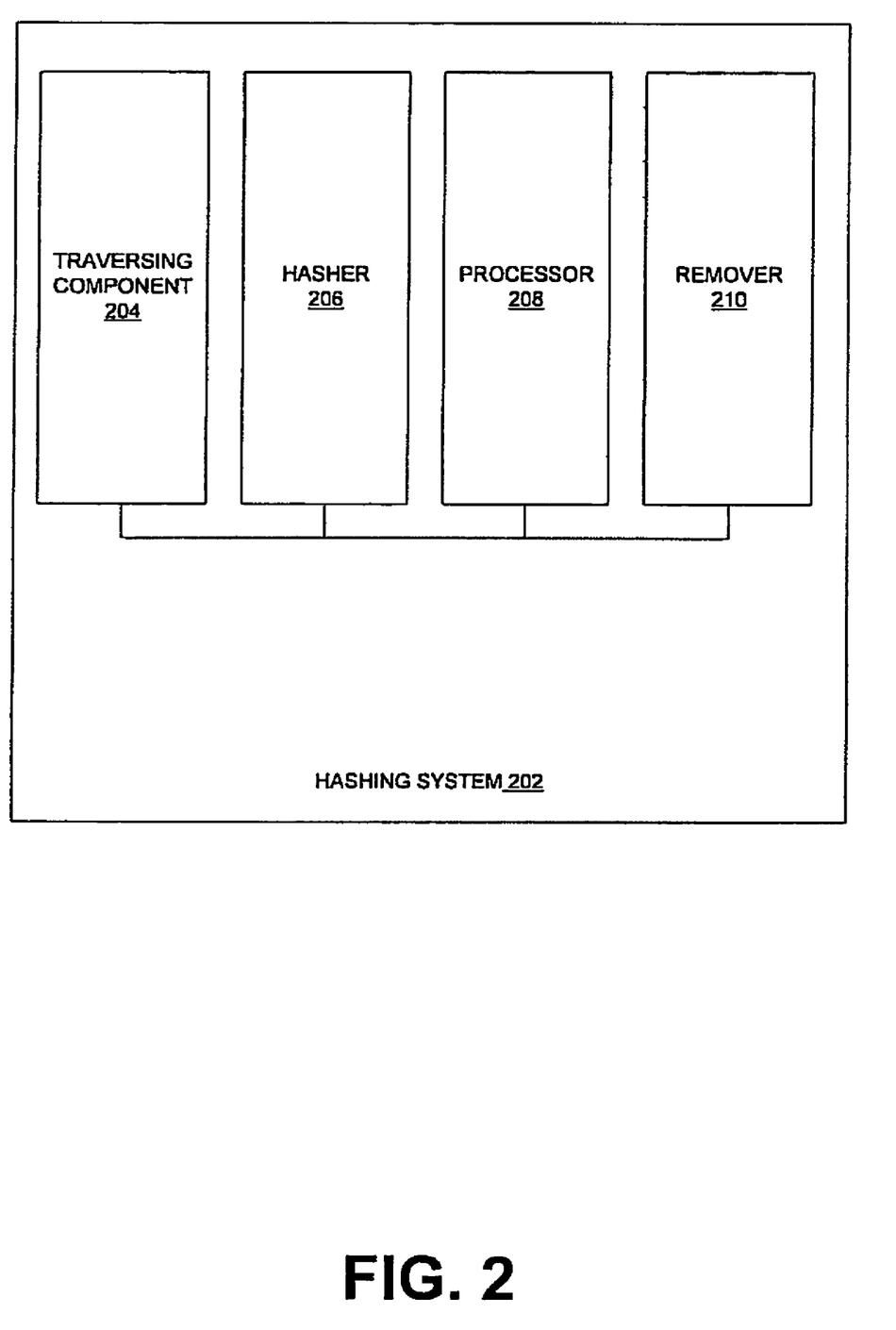
FIG. 2 illustrates a block diagram of a hashing system, upon which embodiments can be implemented.

FIG. 2 illustrates a block diagram of a hashing system 200, upon which embodiments can be implemented. Hashing system 200 includes a traversing component 204 for traversing a directory, hasher 206 for calculating hash values, processor 208 for comparing hash values, and remover 210 for removing files.

Although hashing system 200 is shown and described as having certain numbers and types of elements, the embodiments are not necessarily limited to the exemplary implementation. That is, hashing system 200 can include elements other than those shown, and can include more than one of the elements that are shown. For example, hashing system 200 can include a greater or fewer number of components than the four components (traversing component 204, hasher 206, processor 208, and remover 210) shown.

Hashing system 200, in one embodiment, is an application program that is capable of automatic removal of standard application program files (e.g., enterprise-specific application files). In another embodiment, the application program is also capable of automatically marking and/or flagging standard application program files. FIG. 2, in one example, illustrates an abstract graphical representation of different functional modules of a hashing program. In one example, traversing component 204 traverses one or more directories of a litigation discovery file set. Hasher 206 generates hashcodes corresponding to files in the traversed directories. Also, processor 208 compares the hashcodes to entries in one or more databases. Additionally, remover 210 removes one or more files that yielded hashcodes that are identical to entries in one or more databases. To summarize, by executing hashing system 200, a hash program automatically removes standard application program files from a user-specified file directory. Although in this embodiment the files that yielded hashcodes that are identical to entries in one or more databases are removed, in other embodiments a user can specify to simply mark and/or flag the files instead of removing the files. At a subsequent point in time, the user can manually remove the marked or flagged files if he or she feels that removal of the file is proper.

Figure 3:
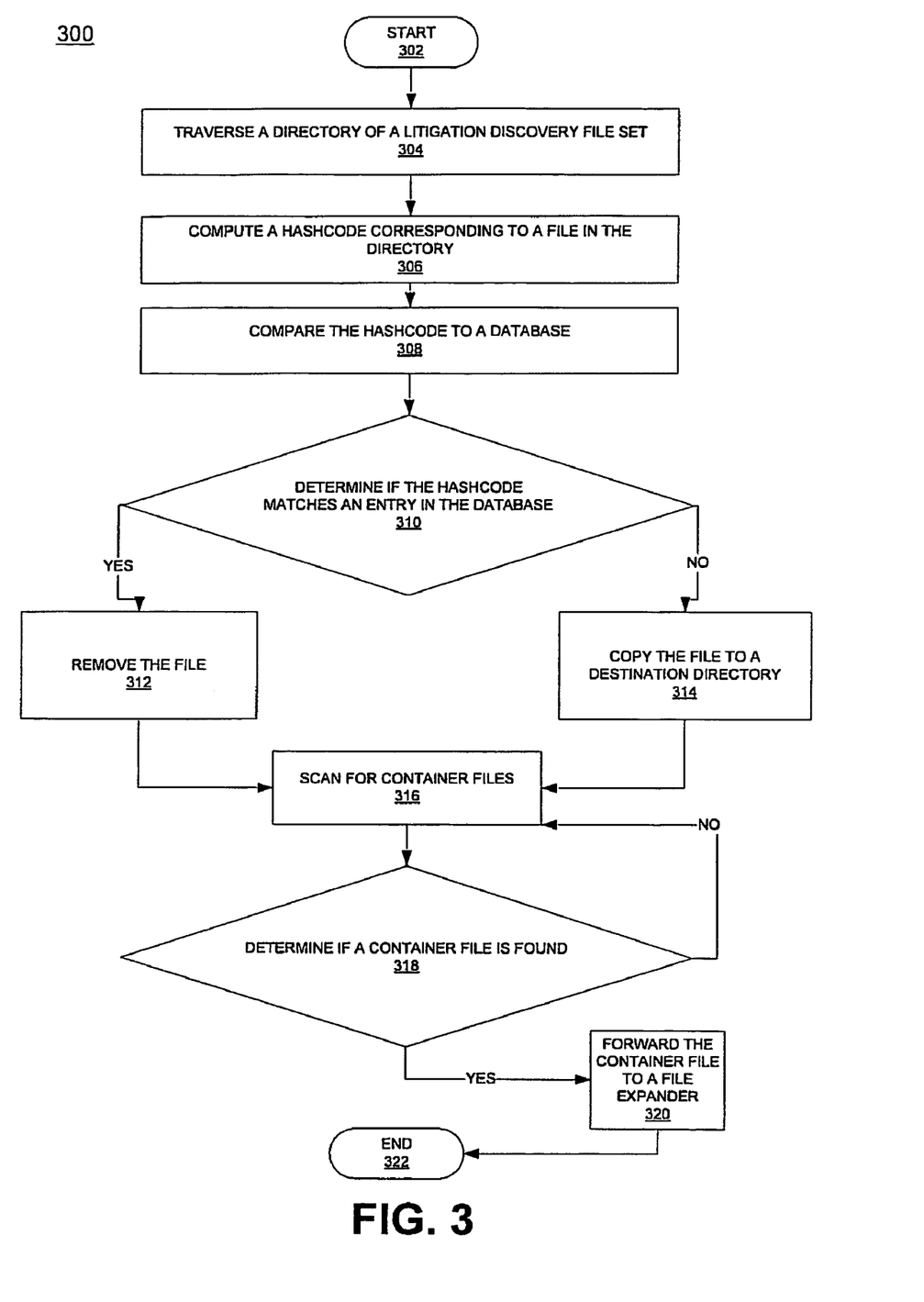
FIG. 3 illustrates a flowchart of a method for culling a litigation discovery file set upon which embodiments can be implemented.

FIG. 3 illustrates a flowchart 300 of a method for culling a litigation discovery file set upon which embodiments can be implemented. Although specific steps are disclosed in flowchart 300, such steps are exemplary. That is, embodiments are well suited to performing various other or additional steps or variations of the steps recited in flowchart 300. It is appreciated that the steps in flowchart 300 can be performed in an order different than presented.

At block 302, the process starts. At block 304, a directory of a litigation discovery file set is traversed. In one embodiment, more than one directories of a litigation discovery file set are traversed. In one embodiment, the traversal is random. In one embodiment, the traversal progresses linearly. Further, in one embodiment, the file traversal occurs automatically without needing user intervention to start the process.

At block 306, a hashcode corresponding to a file in the directory is computed. In one embodiment, the hashcode is computed by using a randomization function. In one embodiment, the hash function utilized to compute the hashcode is a one-to-one function.

At block 308, the hashcode is compared to a database. In one embodiment, the database is the National Institute of Standards (NIST) database. In one embodiment, the database is an enterprise-specific database. In one embodiment, the database is a user created database that includes hashcodes of user-specified files (e.g., commercially released files). In one embodiment, the database includes hashcodes of standard application programs. In one embodiment, the hashcode is compared to a plurality of databases simultaneously.

At block 310, it is determined if the hashcode matches an entry in the database. In one embodiment, the hashcode is a message digest 5 (MD5) hashcode. In one embodiment, the hashcode is another type of compatible hashcode.

At block 312, it is determined that the hashcode matches an entry in the database and the file is removed. In one embodiment, removal is implemented immediately. In one embodiment, removal is time-delayed. In one embodiment, removal is implemented by physically erasing the file. In one embodiment, removal is implemented by flagging and/or marking the file without physical deletion. In another embodiment, the file is flagged but not automatically removed. Upon review, a user can subsequently remove the file manually.

At block 314, it is determined that the hashcode does not match an entry in the database and the file is copied to a destination directory. In one embodiment, the file is copied to multiple destination directories.

At block 316, container files are scanned for. In one embodiment, a container file is a compressed file (e.g., a zip file). In one embodiment, a container file is an email inbox file.

At block 318, it is determined whether a container file is found. If a container file is found, the container file would be forwarded to a file expander. If a container file is not found, in one example, the scanning for container files continue.

At block 320, the container file is forwarded to a file expander. The file expander expands the container file and stores the expanded container file is a destination directory. At block 322, the process ends.

Figure 4:
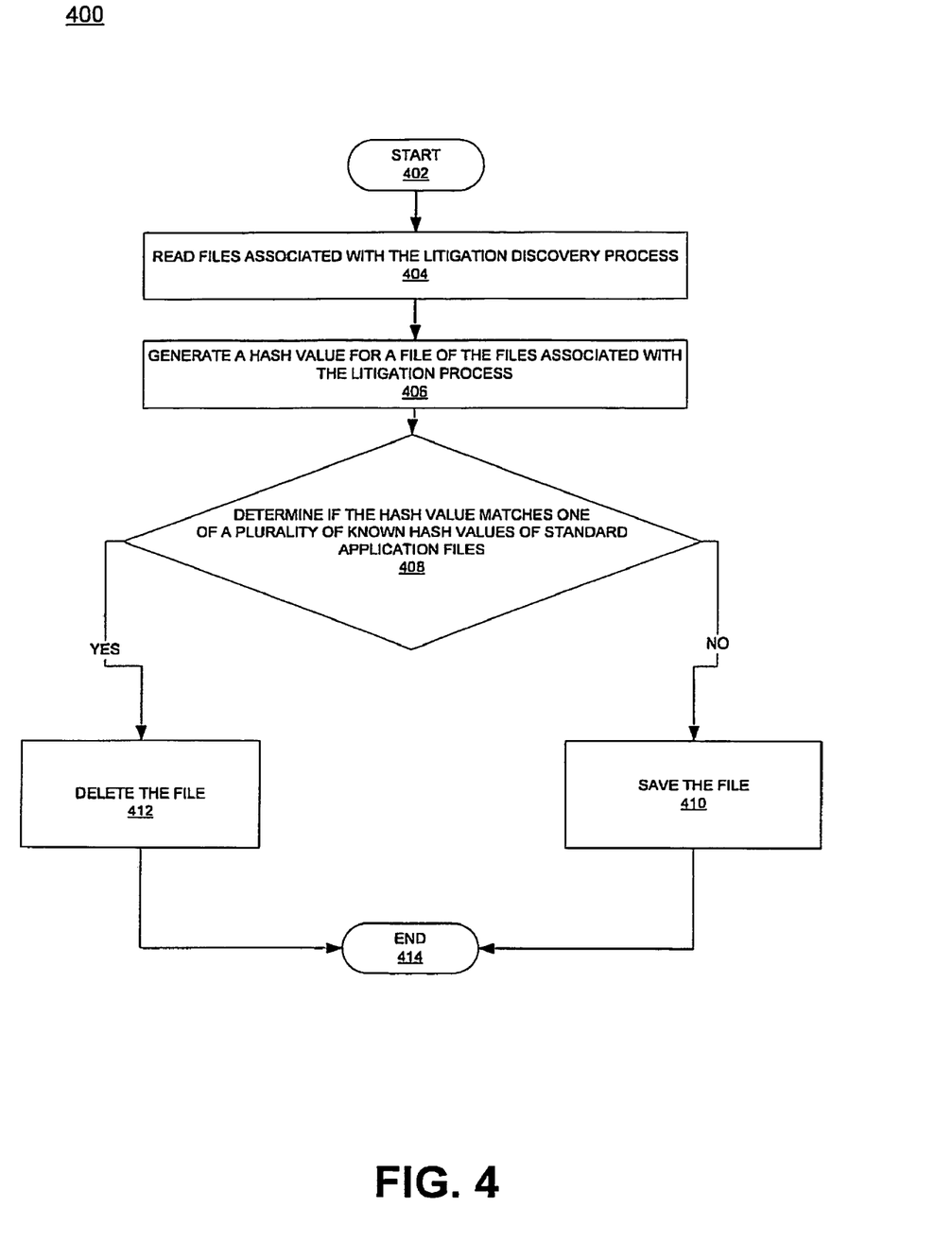
FIG. 4 illustrates a flowchart of a method for culling files associated with a litigation discovery process upon which embodiments can be implemented.

FIG. 4 illustrates a flowchart 400 of a method for culling files associated with a litigation discovery process upon which embodiments can be implemented. Although specific steps are disclosed in flowchart 400, such steps are exemplary. That is, embodiments are well suited to performing various other or additional steps or variations of the steps recited in flowchart 400. It is appreciated that the steps in flowchart 400 can be performed in an order different than presented.

At block 402, the process starts. At block 404, the files associated with the litigation discovery process are read. In one embodiment, reading is implemented by traversing one or more directories of litigation discovery files.

At block 406, a hash value for a file of the files associated with the litigation discovery process is generated. In one embodiment, a hash algorithm is utilized to generate a hash value for a file. In one example, user specification may allow hash values to be generated for all the files associated with the litigation discovery process. In another example, user specification may allow hash values to be generated for only a sub group of all the files associated with the litigation discovery process.

At block 408, it is determined whether the hash value matches one of a plurality of known hash values of standard application files. In one embodiment, the plurality of known hash values includes hash values contained in the NIST database. In another embodiment, the plurality of known hash values includes hash values of released commercial software files. In one embodiment, the plurality of known hash values includes hash values contained in an enterprise specific database. The enterprise specific database, in one example, includes hash values of standard enterprise application programs.

At block 410, it is determined that the hash value does not match at least one of the plurality of known hash values of standard application files. The file is saved. In one embodiment, the file is saved in a destination directory.

At block 412, it is determined that the hash value matches one of the plurality of known hash values of standard application files. The file is deleted. Deletion may be implemented by physically erasing the file from memory almost instantaneously or by marking the file for time-delayed deletion. In other embodiments, the file is marked but not automatically deleted. Instead, a user is able to review the marked file at a later point in time and delete the file manually the user feels the deletion is proper and does not interfere with the litigation discovery process. At block 414, the process ends.

Figure 5:
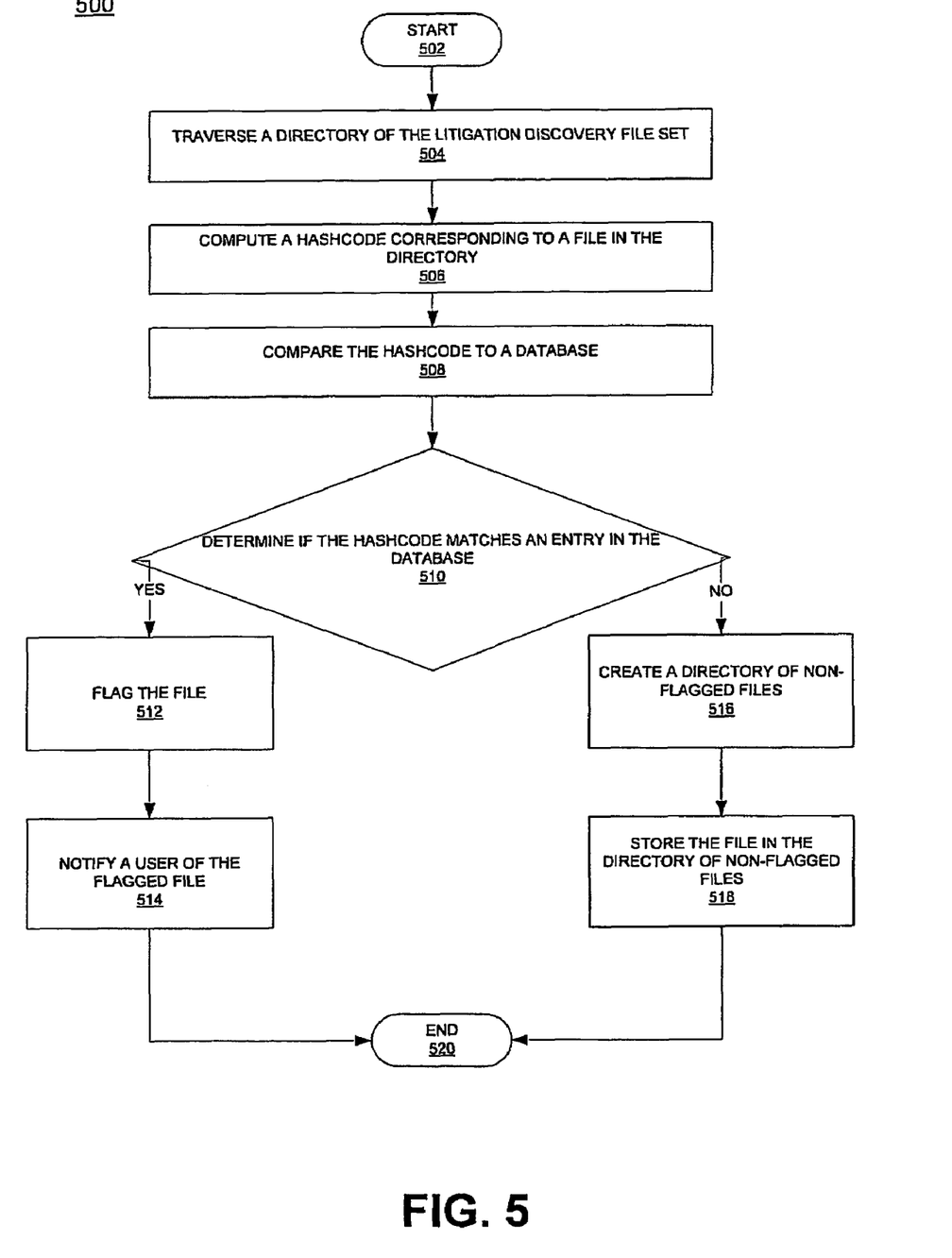
FIG. 5 illustrates a flowchart of a method for reducing the size of a litigation discovery file set, upon which embodiments can be implemented.

FIG. 5 illustrates a flowchart 500 of a method for reducing the size of a litigation discovery file set, upon which embodiments can be implemented. Although specific steps are disclosed in flowchart 500, such steps are exemplary. That is, embodiments are well suited to performing various other or additional steps or variations of the steps recited in flowchart 500. It is appreciated that the steps in flowchart 500 can be performed in an order different than presented.

At block 502, the process starts. At block 504, a directory of the litigation discovery file set is traversed. The traversal can be random or linear. Also, more than one directory may be traversed.

At block 506, a hashcode corresponding to a file in the directory is computed. In one embodiment, the computation is implemented by a one-to-one hash algorithm.

At block 508, the hashcode is compared to a database. In one embodiment, the database is the NIST database. In one embodiment, the database is an enterprise-specific database.

At block 510, it is determined whether the hashcode matches an entry in the database. At block 512, it is determined that the hashcode matches an entry in the database and is accordingly flagged. At block 514, a user is notified of the flagged file. In one embodiment, the notification is automatic. Also, a user notified of the flagged file can choose to either delete the file or leave the file intact. At block 516, it is determined that the hashcode does not match at least one entry in the database. A non-flagged files directory is created.

At block 518, the file that generated a hashcode that did not match at least one entry in the database is stored in the directory of non-flagged files. In one embodiment, the files stored in the directory of non-flagged files are ready for indexing and viewing. At block 520, the process ends.

Figure 6:
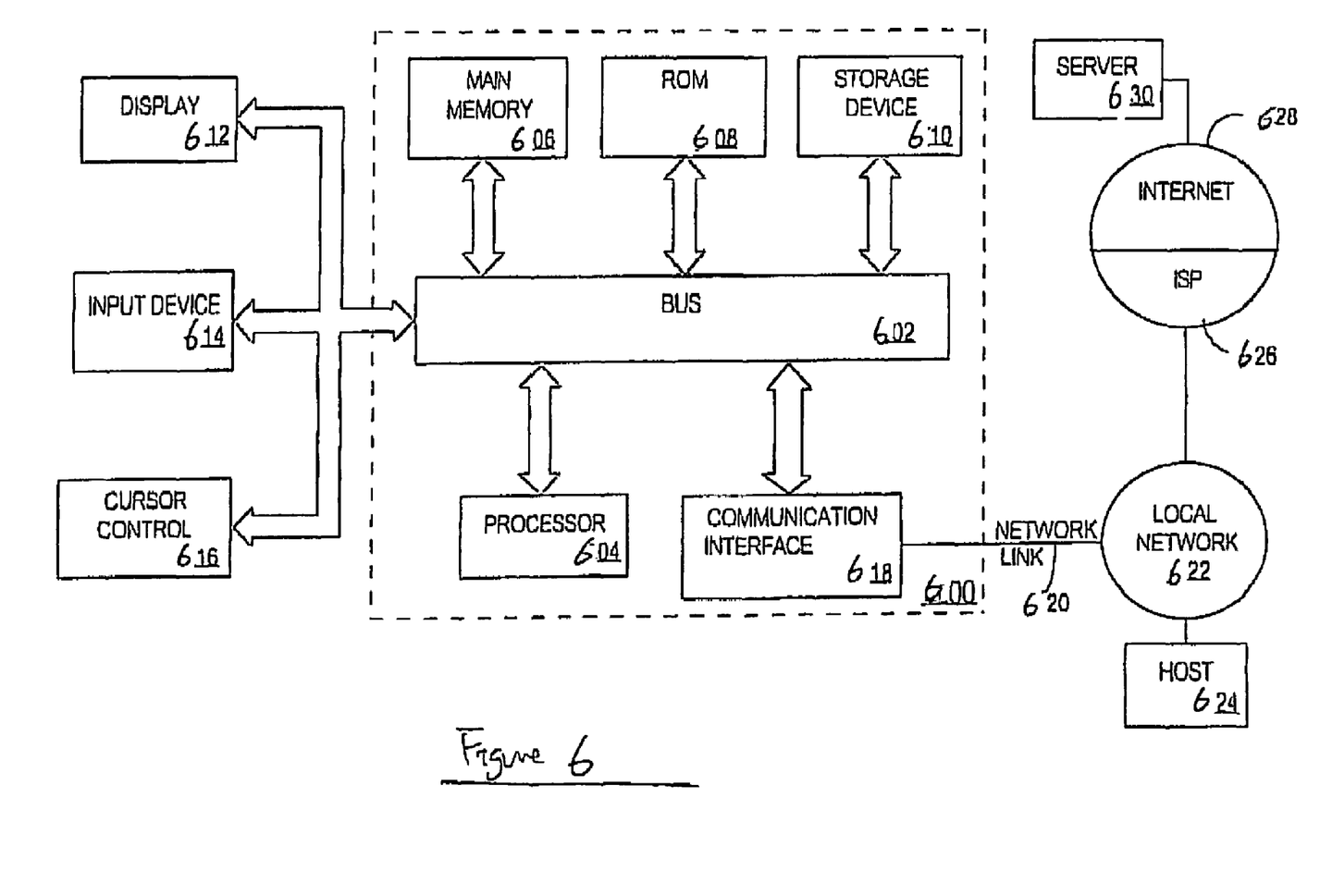
FIG. 6 is a block diagram that illustrates a computer system having stored therein instruction that when executed by a processor implements a method for reducing the size of a litigation discovery file set, upon which embodiments of the may be implemented.

FIG. 6 is a block diagram that illustrates a computer system 600 having stored therein instruction that when executed by a processor implements a method for reducing the size of a litigation discovery file set, upon which embodiments of the may be implemented. Computer system 600 includes a bus 602 or other communication mechanism for communicating information, and a processor 604 coupled with bus 602 for processing information (litigation related information). Computer system 600 also includes a main memory 606, such as a random access memory (RAM) or other dynamic storage device, coupled to bus 602 for storing information and instructions (e.g., instructions for comparing files to a National Institute of Standards and Technology database) to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to an optional display 612 for displaying information to a reviewer. An input device 614, including alphanumeric and other keys, may be coupled to bus 602 for communicating information and command selections to processor 604. Another type of reviewer input device may include a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to utilizing computer system 600 for reducing the size of a litigation discovery file set. According to one embodiment of the invention, the reduction of the size of a litigation discovery file set is provided by computer system 600 in response to processor 604 executing one or more sequences of one or more instructions contained in main memory 606. Such instructions may be read into main memory 606 from another computer readable medium, such as storage device 610. Execution of the sequences of instructions contained in main memory 606 causes processor 604 to perform the process steps (e.g., identify and remove standard system files) described herein. One or more processors in a multi-processing arrangement may also be employed to execute the sequences of instructions contained in memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data (e.g., individual custodian data) on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 may also include a communication interface 618 coupled to bus 602. Communication interface 618 may provide a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices and reviewers. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of carrier waves transporting the information.

Computer system 600 can send and receive data (e.g., corporate emails), including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

To summarize, embodiments allow an automatic and proficient culling of litigation discovery files. The litigation discovery files, when eliminated of standard application files, may be significantly smaller in size. For example, a file set can often achieve a 30% or more reduction in file size after undergoing the culling process. Advantageously, by using effective methods and systems for removing and/or flagging standard application files, embodiments allow litigation discovery files to be processed in a far more efficient manner.

In the foregoing specification, embodiments of the invention have been described with reference to numerous specific details that can vary from implementation to implementation. Thus, the sole and exclusive indicator of what is, and is intended by the applicants to be the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An article of manufacture including a machine-readable medium having instructions for culling a litigation discovery file set stored thereon that, in response to execution by a computing device, cause the computing device to perform operations the comprising:
   electronically collecting a plurality of data files from one or more sources;
   generating the litigation discovery file set from the plurality of data files;
   traversing a directory of the litigation discovery file set to cull the litigation discovery file set;
   identifying at least one of the collected data files that is a program application file by:
      computing a first hash code corresponding to a file in the directory;
      comparing the first hash code to one or more second hash codes associated with standard application program files, enterprise application program files or user-specified application program files, or combinations thereof;
   wherein the second hash codes are stored in one or more databases, the one or more databases are separate from the litigation discovery file set and the second hash codes are independent of the plurality of data files;
   modifying the litigation discovery file set by:
      removing or flagging the file in the directory if the first hash code matches one or more of the second hash codes;
      maintaining metadata associated with the flagged file in the directory of the litigation discovery file set; and
      restoring the directory of the litigation discovery file set to a pre-culled state with the metadata associated with the flagged file.

2. The machine-readable medium of claim 1, having instructions that, in response to execution by a computing device, cause the computing device to perform operations further comprising:
   copying the file to one or more destination directories if the first hash code does not match at least one second hash code in the one or more databases.

3. The machine-readable medium of claim 1, having instructions that, in response to execution by a computing device, cause the computing device to perform operations further comprising:
   scanning the litigation discovery file set for container files; and
   forwarding the container file to a container file expander if a container file is found, wherein the container file expander expands the container file and stores the expanded container file in a destination directory.

4. The medium of claim 3, wherein the container file is an email inbox file or a compressed file, or combinations thereof.

5. A method for culling a set of litigation discovery files comprising:
   accessing a directory of the set of litigation discovery files;
   generating a first hash value corresponding to a selected file of the litigation discovery files;
   culling the litigation discovery files by:
      determining if the first hash value matches one of a plurality of known second hash values corresponding to standard application files, enterprise application program files or user-specified files, or combinations thereof wherein the known second hash values are maintained in one or more databases separate from the set of litigation discovery files; and
      flagging or deleting the selected file if the first hash value matches one of the plurality of known second hash values; and
   saving the selected file in the directory if the first hash value does not match at least one of the plurality of known second hash values;
   maintaining metadata associated with the selected file in the directory; and
   restoring the directory of the set of litigation discovery files to a pre-culled state using the metadata.

6. The method of claim 5, wherein the deleting of the selected file in the directory is time delayed.

7. The method of claim 5, wherein the method further comprises computing hash codes corresponding to a plurality of files in the directory, where the plurality represents a subgroup of all of the files in the litigation discovery file set.

8. A apparatus for culling litigation discovery files comprising:
   means for electronically collecting a plurality of data files from one or more sources;
   means for generating a litigation discovery file set from the collected plurality of data files;
   means for culling the litigation discovery file set comprising:
      means for traversing one or more directories of the litigation discovery file set;
      means for generating first hash codes corresponding to files in the one or more directories;
      means for identifying that at least one of the collected plurality of data files in the litigation discovery file set is a software application file by comparing the first hash codes to second hash codes, the second hash codes maintained in one or more databases, wherein the one or more databases are maintained separately from the litigation discovery file set and where the one or more databases comprise: standard application files, enterprise application program files or user-specified files, or combinations thereof; and
      means for modifying the litigation discovery file set comprising:
         means for flagging or removing one or more files, where the files yield first hash codes identical to one or more of the second hash codes;
         means for maintaining metadata associated with one or more flagged or removed files in the one or more directories; and
         means for restoring the one or more directories to a pre-culled state using the metadata.

9. The apparatus of claim 8, wherein the means for generating first hash codes is configured to execute two or more hash operations simultaneously.

10. The apparatus of claim 8, wherein the removal of the one or more files is time delayed.

11. A computer-readable medium having stored thereon instructions that when executed by a processor cause the processor to execute a method for reducing a size of a litigation discovery file set, the method comprising:
   electronically collecting multiple data files from one or more sources with a data management system;
   generating a litigation discovery file set from said collected multiple data files;
   traversing a directory of the litigation discovery file set;
   computing a first hash code corresponding to a file in the directory;

identifying, with the data management system, at least one of the collected data files that is a software application file by comparing the first hash code with second hash code entries in a separate database, wherein the one or more databases are associated with standard application program files, enterprise application program files or user-specified files, or combinations thereof, wherein the second hash codes are stored in the one or more databases, the one or more databases are separate from the litigation discovery file set and the second hash codes are independent of the collected multiple data files;

determining if the first hash code matches a second hash code entry in the one or more separate databases;

reducing the size of the litigation file set by flagging and removing matching files in the litigation file set; and maintaining metadata associated with the flagged file for restoring the directory of the litigation discovery file set to an original state.

12. The computer readable medium of claim 11 wherein the method further comprises notifying a user of the flagged file.

13. The computer readable medium of claim 11 wherein the method further comprises:
creating a second directory for non-flagged files;
if the first hash code does not match at least one entry in the separate database, storing the file in the second directory for non-flagged files.

14. An apparatus, for culling a litigation discovery file set comprising:
one or more processors; and
a memory coupled to the processors comprising instructions executable by the processors, the processors when executing the instructions are configured to:
collect multiple data of files from one or more sources;
traverse a directory of the litigation discovery file set;
generate a first hash code corresponding to a file in the directory;
compare the first hash code to one or more second hash codes associated with standard application program files, enterprise application program files or user-specified files, or combinations thereof to identify at least one of the collected multiple data files that is a software application file;
wherein the second hash codes are stored in one or more databases, the one or more databases are separate from the litigation discovery file set and the second hash codes are independent of archived electronic message files;
remove or flag the file in the directory if the first hash code matches one or more of the second hash codes;
maintain metadata associated with a flagged or removed file in the directory of the litigation discovery file set; and
restore the directory of the litigation discovery file set to a pre-culled condition using the metadata.

15. The apparatus of claim 14 wherein the processors when executing the instructions are further configured to:
copy the file to one or more destination directories if the first hash code does not match at least one second hash code in the one or more databases.

16. The apparatus of claim 14 wherein the processors when executing the instructions are further configured to:
scan the litigation discovery file set for container files; and
forward the container file to a container file expander if a container file is found, wherein the container file expander expands the container file and stores the expanded container file in a destination directory.

* * * * *

UNITED STATES PATENT AND TRADEMARK OFFICE
CERTIFICATE OF CORRECTION

PATENT NO.         : 7,716,196 B2                              Page 1 of 1
APPLICATION NO.    : 11/501154
DATED              : May 11, 2010
INVENTOR(S)        : Ghielmetti et al.

It is certified that error appears in the above-identified patent and that said Letters Patent is hereby corrected as shown below:

Column 10, line 19 (Claim 8):    Delete "A apparatus" and insert -- An apparatus --, therefor.

Signed and Sealed this
Twenty-fifth Day of January, 2011

David J. Kappos
*Director of the United States Patent and Trademark Office*